(12) United States Patent
Matsumoto

(10) Patent No.: US 9,165,390 B2
(45) Date of Patent: Oct. 20, 2015

(54) OBJECT DETECTION FRAME DISPLAY DEVICE AND OBJECT DETECTION FRAME DISPLAY METHOD

(75) Inventor: Yuichi Matsumoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 204 days.

(21) Appl. No.: 14/123,610

(22) PCT Filed: May 15, 2012

(86) PCT No.: PCT/JP2012/003148
§ 371 (c)(1),
(2), (4) Date: Dec. 3, 2013

(87) PCT Pub. No.: WO2012/169119
PCT Pub. Date: Dec. 13, 2012

(65) Prior Publication Data
US 2014/0104313 A1    Apr. 17, 2014

(30) Foreign Application Priority Data

Jun. 10, 2011   (JP) ................................ 2011-130200

(51) Int. Cl.
*G06T 1/00*     (2006.01)
*G06T 7/00*     (2006.01)
(Continued)

(52) U.S. Cl.
CPC ............ *G06T 11/60* (2013.01); *G06K 9/00228* (2013.01); *G06K 9/00369* (2013.01); *G06K 9/60* (2013.01); *G06T 7/0042* (2013.01); *G06T 11/203* (2013.01); *H04N 5/23219* (2013.01);
(Continued)

(58) Field of Classification Search
None
See application file for complete search history.

(56) References Cited

U.S. PATENT DOCUMENTS 5,099,324 A    3/1992   Abe
2005/0219395 A1    10/2005   Sugimoto
(Continued)

FOREIGN PATENT DOCUMENTS

CN    1678032    10/2005
CN    101188677    5/2008
(Continued)

OTHER PUBLICATIONS

Search Report (English translation) in China Patent Application No. 201280028590.8, mail date is Jul. 3, 2015.
(Continued)

*Primary Examiner* — Ming Hon
*Assistant Examiner* — Phuc Doan
(74) *Attorney, Agent, or Firm* — Greenblum & Bernstein, P.L.C.

(57) ABSTRACT

Provided is an object frame display device (100) in which: an object detection frame computation unit (102) derives a first object detection frame which denotes a region of an object to be detected by carrying out a pattern recognition process on an inputted image, and derives a second object detection frame by integrating first object detection frames which are inferred to be object detection frames relating to the same object to be detected; a containment frame computation unit (103) derives, for each second object detection frame, a third object detection frame which contains the first object detection frame upon which the second object detection frame is based; and a display frame forming unit (105) forms an object detection frame which is displayed on the basis of a relation between the size of the second object detection frame and the size of the third object detection frame.

7 Claims, 16 Drawing Sheets

(51) Int. Cl.
  *G06T 11/60* (2006.01)
  *G06K 9/00* (2006.01)
  *G06K 9/60* (2006.01)
  *G06T 11/20* (2006.01)
  *H04N 5/232* (2006.01)

(52) U.S. Cl.
  CPC .. *H04N 5/23293* (2013.01); *G06T 2207/30196* (2013.01)

(56) References Cited

U.S. PATENT DOCUMENTS

| | | | |
|---|---|---|---|
| 2007/0165951 A1* | 7/2007 | Akahori et al. | 382/195 |
| 2007/0236762 A1* | 10/2007 | Tsuji | 358/537 |
| 2008/0118156 A1 | 5/2008 | Okada | |
| 2008/0158407 A1* | 7/2008 | Funamoto | 348/345 |
| 2008/0226140 A1 | 9/2008 | Okamura | |
| 2010/0329550 A1* | 12/2010 | Cheatle | 382/165 |
| 2012/0236024 A1 | 9/2012 | Fujii et al. | |
| 2013/0108122 A1* | 5/2013 | Ptucha | 382/118 |

FOREIGN PATENT DOCUMENTS

| | | |
|---|---|---|
| CN | 101266649 | 9/2008 |
| JP | 03-035399 | 2/1991 |
| JP | 2005-286940 | 10/2005 |
| JP | 2007-188419 | 7/2007 |
| JP | 2007-306463 | 11/2007 |
| JP | 2008-252713 | 10/2008 |
| JP | 2009-060291 | 3/2009 |
| JP | 2010-039968 | 2/2010 |

OTHER PUBLICATIONS

International Search Report in PCT/JP2012/003148, mail date is Jun. 19, 2012.

U.S. Appl. No. 14/123,771 to Takeshi Fujimatsu et al., which was filed on Dec. 4, 2013.

* cited by examiner

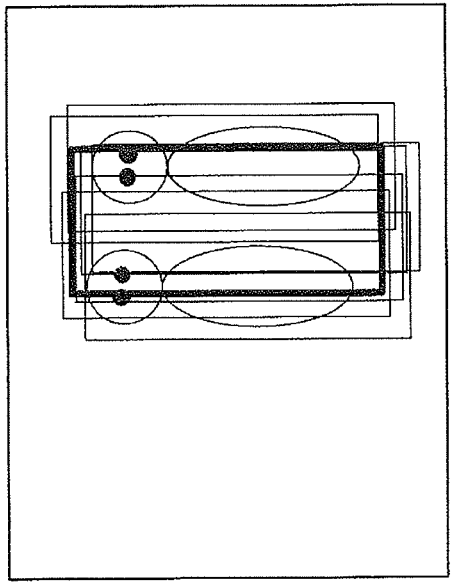
FIG. 1B
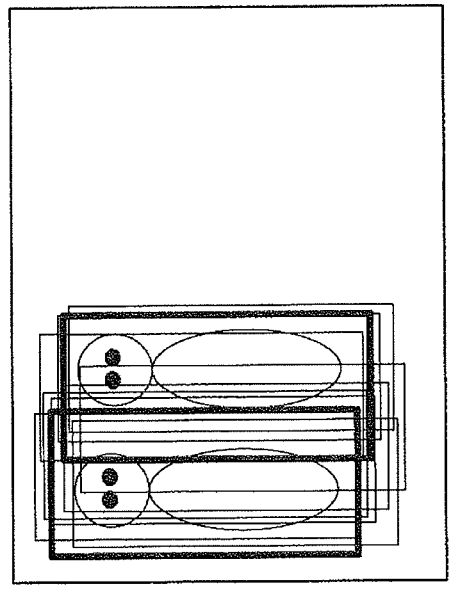
FIG. 1D
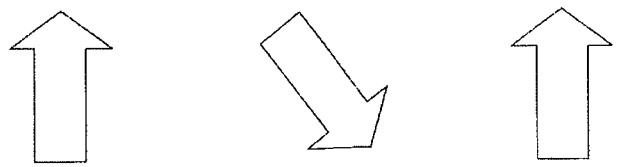
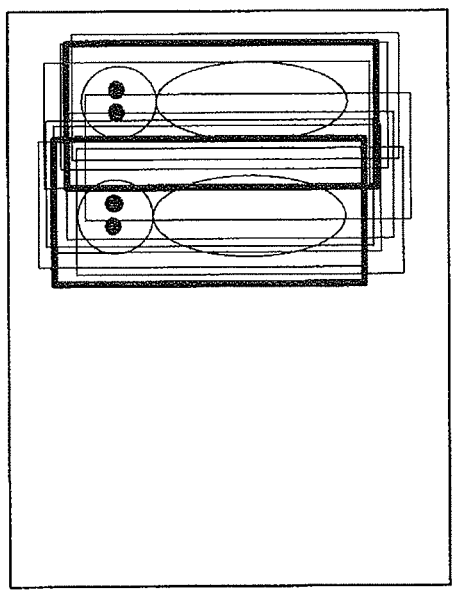
FIG. 1A
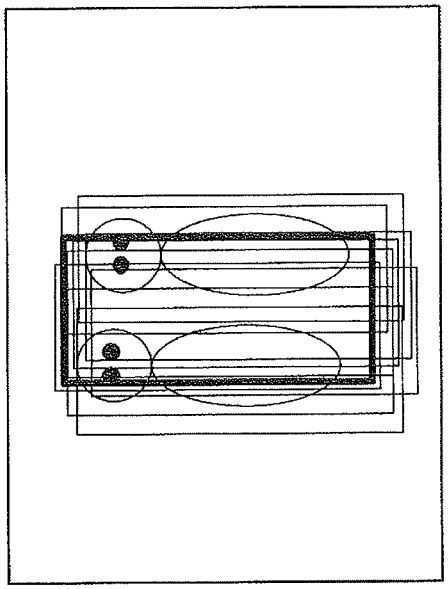
FIG. 1C

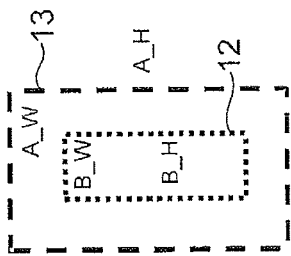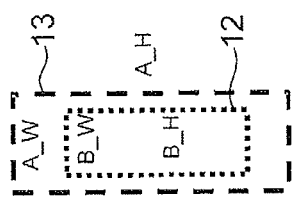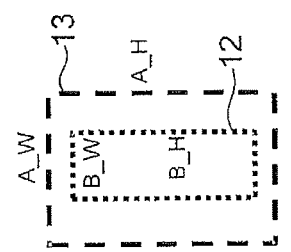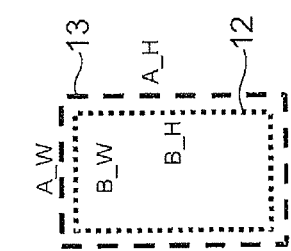
FIG. 4A
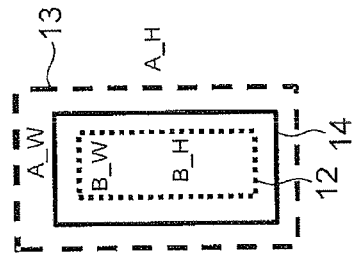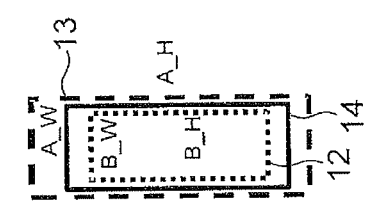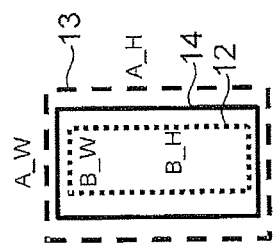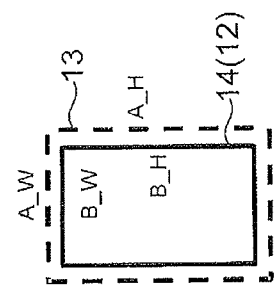
FIG. 4B

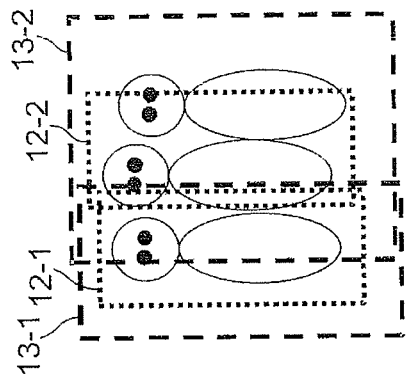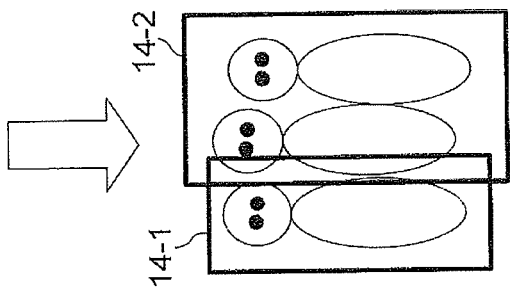
FIG. 6C
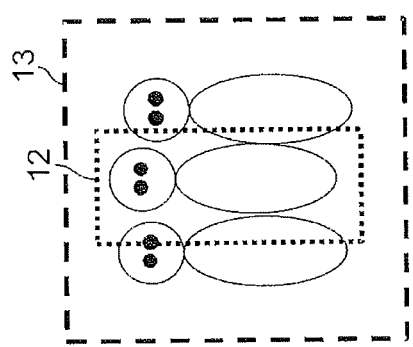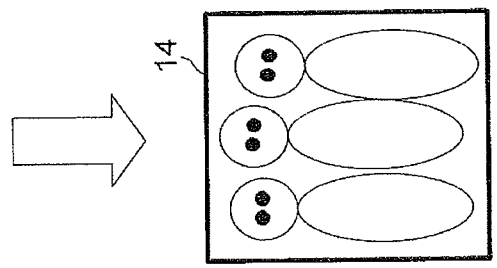
FIG. 6B
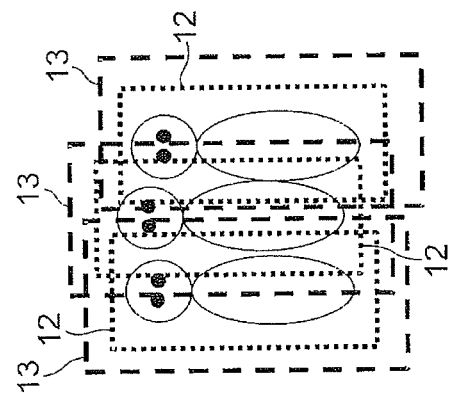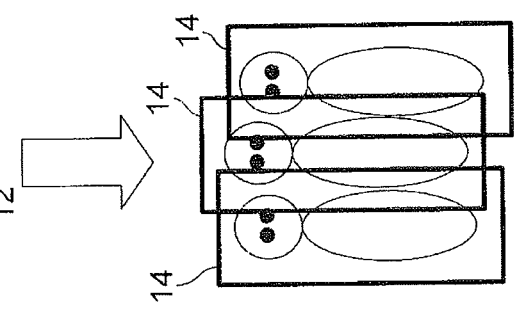
FIG. 6A

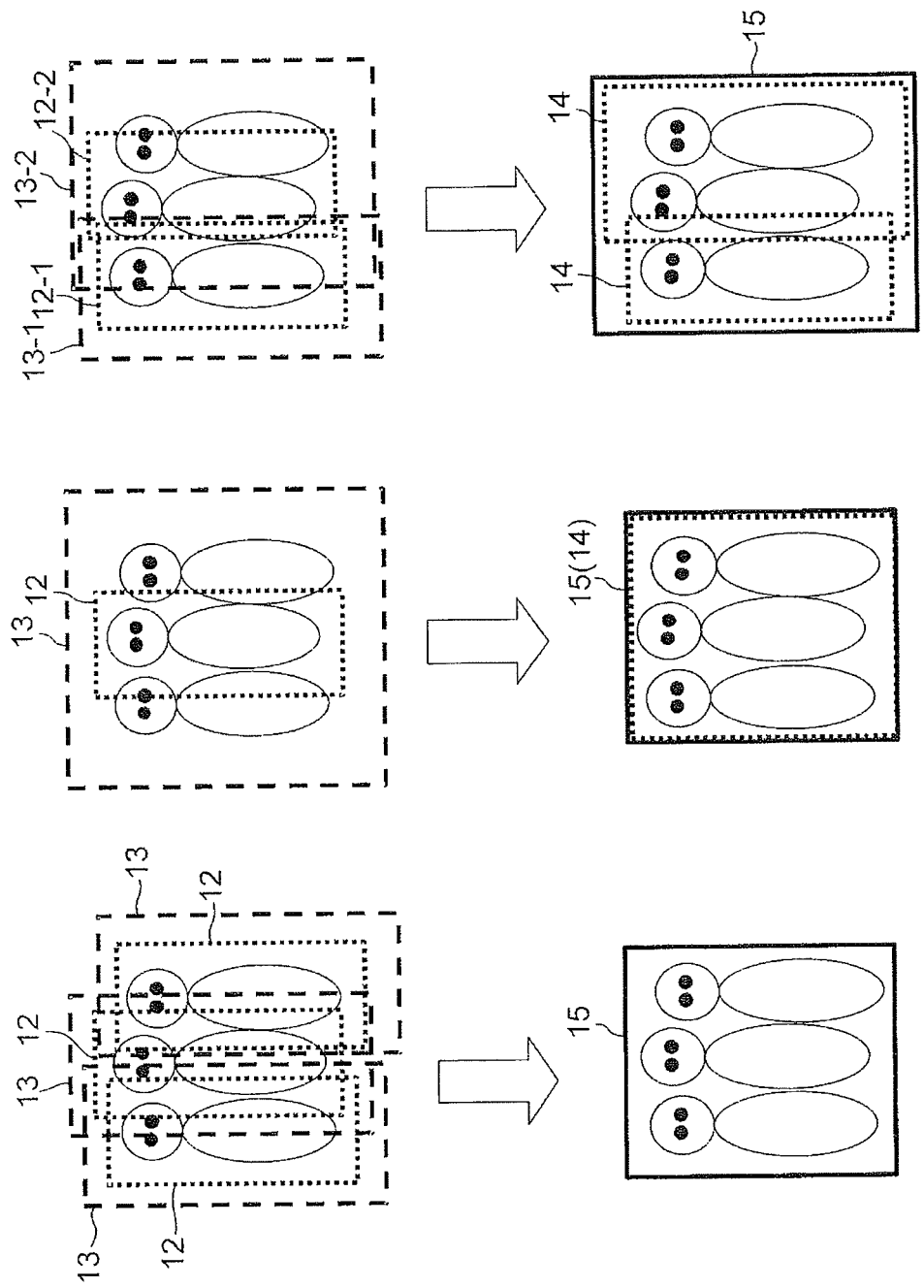

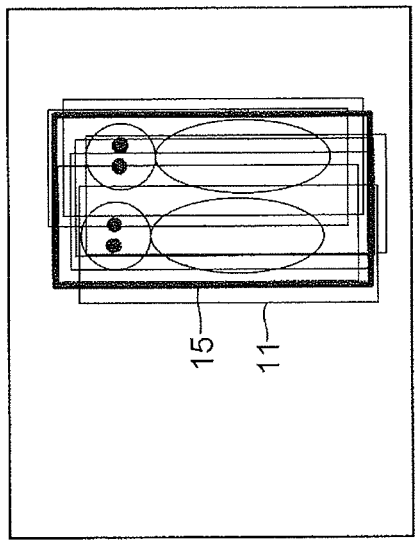
FIG. 12A
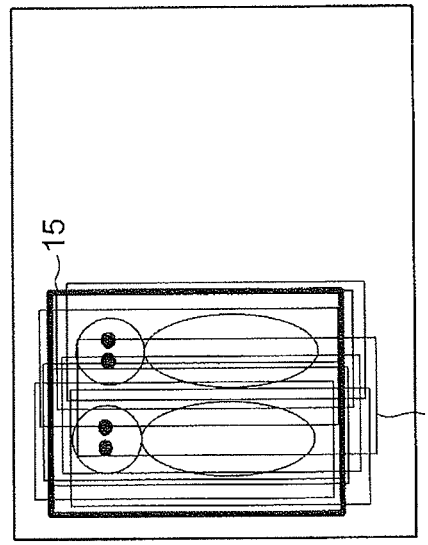
FIG. 12B
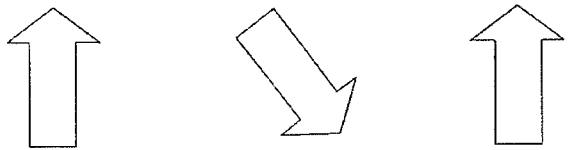
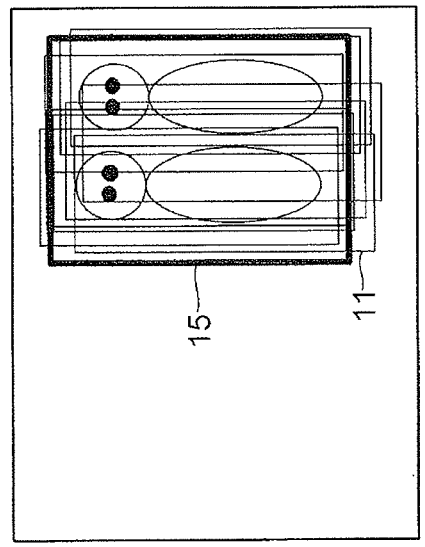
FIG. 12C
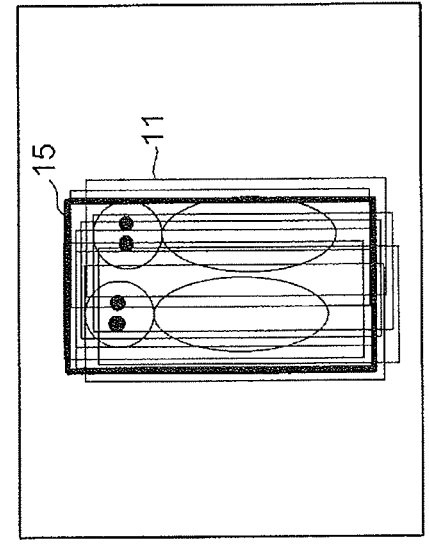
FIG. 12D

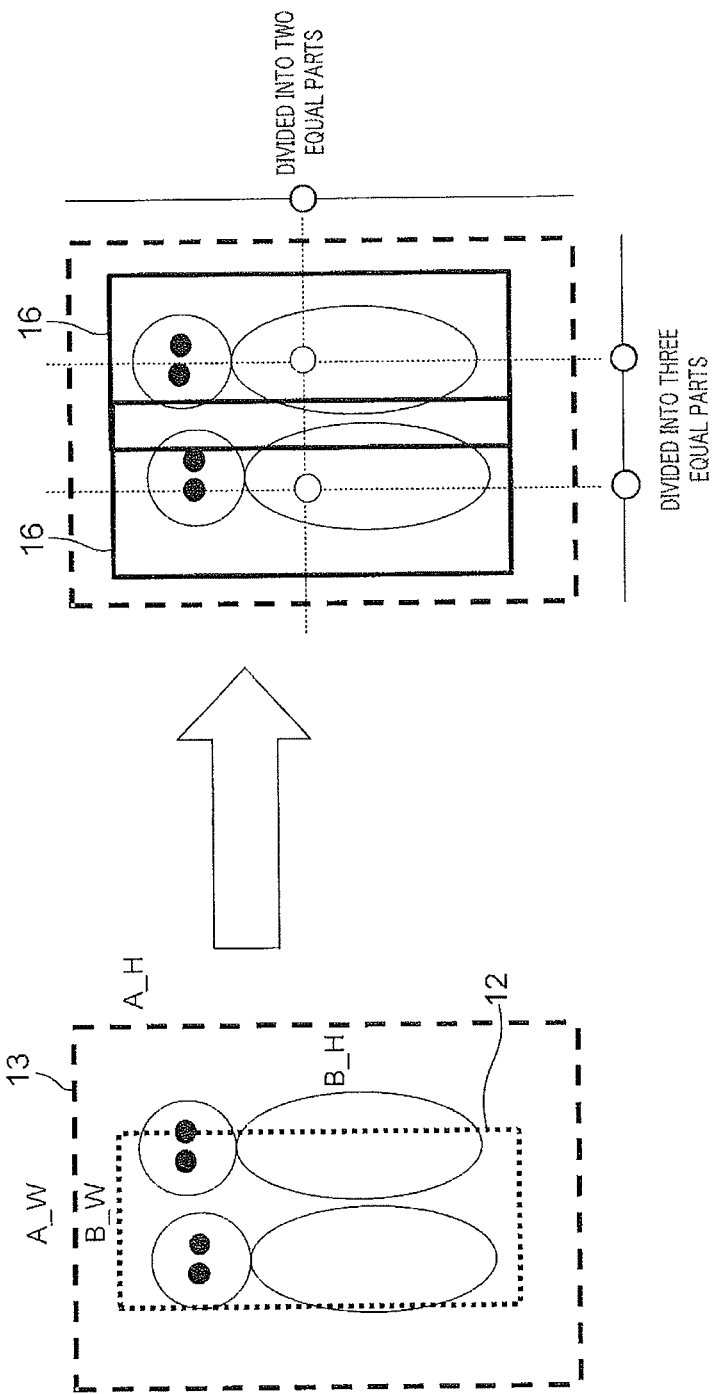

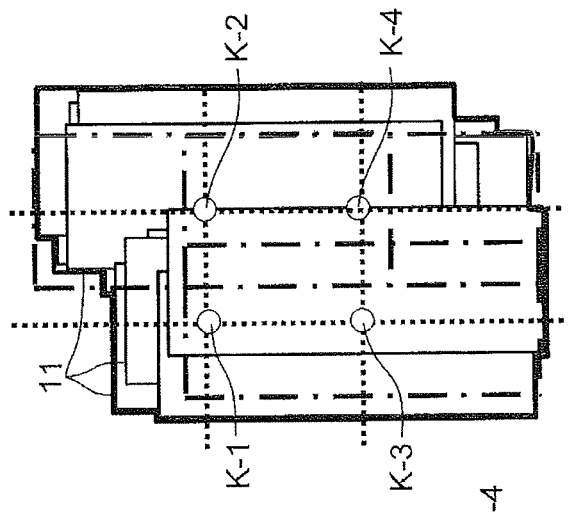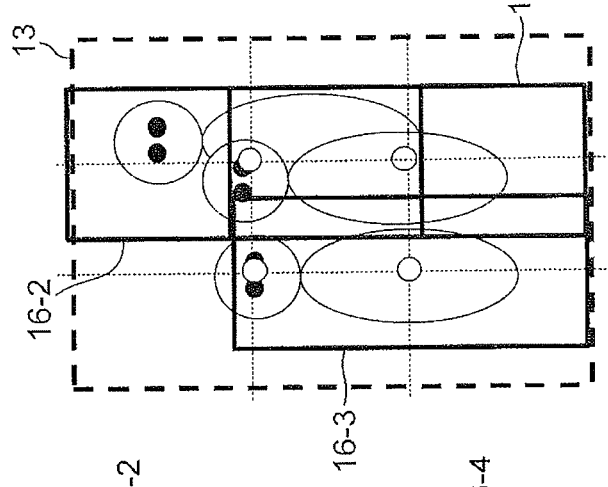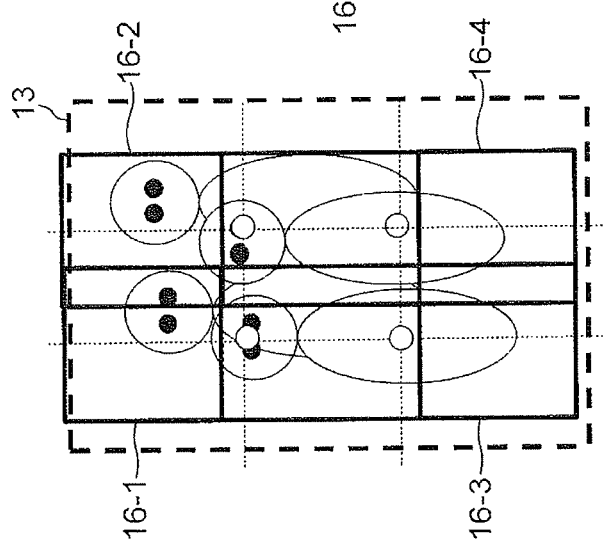

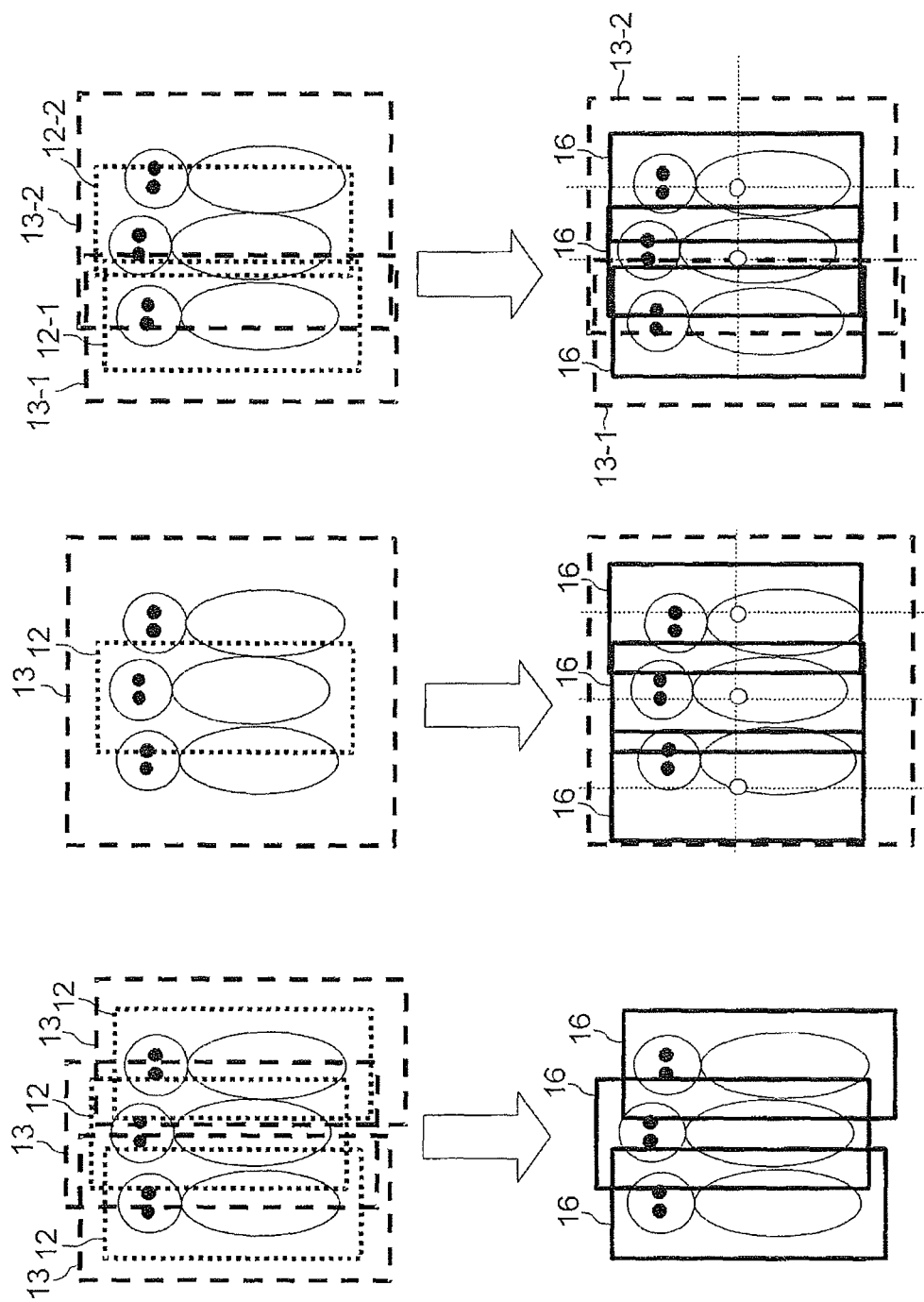

OBJECT DETECTION FRAME DISPLAY DEVICE AND OBJECT DETECTION FRAME DISPLAY METHOD

TECHNICAL FIELD

The present invention relates to an object detection frame display apparatus and an object detection frame display method, and in particular to art for displaying an object detection frame such as a face recognition frame in a display in an imaging apparatus such as a digital camera.

BACKGROUND ART

In recent years, some imaging apparatuses such as digital cameras are configured to detect from the image being captured the region of a person or a face and to display the region surrounded by a frame (hereinafter, called an object detection frame) (refer to, for example, Patent Literature (hereinafter, abbreviated as "PTL") 1).

Displaying an object detection frame enables a user to instantaneously judge where in the image of a subject a target such as a person or face (hereinafter sometimes called a detection target object) is located, and allows the user to smoothly perform an operation such as disposing the target in the center of the image being captured. In an imaging apparatus that performs automatic focus (AF) or automatic exposure (AE) control at a surrounded target, the user can also verify the region in which the focus point or exposure is adjusted, based on the object detection frame.

In this case, of course, displaying of an object detection frame requires art for detecting an object. PTL 2 describes art for detecting a face in an image being captured. In PTL 2, an indicator value (score) of similarity between sample face images determined by pre-learning and the image to be captured is calculated, and an image region in which the indicator value is at least a threshold is detected as a candidate region for a face image. Actually, because a plurality of candidate regions are detected in the area surrounding the same face image, that is, because a candidate region group is detected, in PTL 2, further threshold judgment of these candidate regions is performed to integrate candidate regions of one and the same face image.

Combining the object detection frame described in PTL 1 and the object detection described in PTL 2, the following object detection window display processing is performed.

Specifically, first, raster scanning of the input image using an object detector forms object detection frame candidates around a target object. Next, integrating object detection frame candidates in proximity to one another forms and displays the ultimate integrated frame. Specifically, grouping is done while using the scores and the like of detection frame candidates, and grouped detection frame candidates in proximity to one another are integrated and displayed. As a result, an object detection frame surrounding the target object (ultimate integrated frame) is displayed.

CITATION LIST

Patent Literatures

PTL 1
Japanese Patent Application Laid-Open No. 2005-286940
PTL 2
Japanese Patent Application Laid-Open No. 2007-188419

SUMMARY OF INVENTION

Technical Problem

However, if a plurality of detection target objects exist in proximity to one another within an image to be captured, it is difficult to form and display the ultimate integrated frame at the proper position because the overlapping between the object detection frame candidates becomes large.

Specifically, if a plurality of detection target objects exist in proximity to one another within an image to be captured, the ultimate integrated image is not separated, and the ultimate integrated frame is formed and displayed between the plurality of detection target objects. Accordingly, so that the ultimate integrated frame cannot contain the detection target object and does not look good in this case.

FIGS. 1A to 1D show a specific example of this case. FIGS. 1A to 1D show time-sequence images of substantially the same position captured in the sequence FIGS. 1A, 1B, 1C, and then 1D. The object detection frame display apparatus detects two persons in the image to be captured. The rectangular frames shown in the drawing by thin lines are object detection frame candidates, and the rectangular frames shown by thick lines are the ultimate integrated frames. What is actually displayed is the image to be captured and the ultimate integrated frame superimposed thereover, and the object detection frame candidates can either be displayed or not be displayed.

FIGS. 1A and 1D are cases in which separation of the ultimate integrated frame is successful. In these successful cases, the displayed ultimate integrated frame contains each of the persons that are the detection targets. FIGS. 1B and 1C are cases in which separation of the ultimate integrated frame fails, where the ultimate integrated frame is displayed between the two persons. In these failure cases, the ultimate integrated frame cannot contain the persons that are the detection targets. Thus, as can be seen from FIGS. 1B and 1C, the ultimate integrated frame does not look good in relationship with the detection target objects.

One method for solving the above-noted problem is to devise an appropriate integration algorithm for use when forming the ultimate integrated frame. This, however, has the problem of making the algorithm complex, which increases the amount of processing and makes the configuration complex.

The present invention has been made in consideration of the above-noted points, and aims at providing an object detection frame display apparatus and an object detection frame display method each being capable of displaying an object detection frame easily viewable by a user, with a relatively small amount of processing.

Solution to Problem

An object detection frame display apparatus according to an aspect of the present invention includes: an object detection frame computation section that determines first object detection frames each indicating a region of a detection target object from an input image, and that further determines a second object detection frame by integrating the first object detection frames analogically inferred to be object detection frames related to the same detection target object; a containment frame computation section that determines, for each of the second object detection frames, a third object detection frame containing the first object detection frames serving as a basis for determining the second object detection frame; a display frame forming section that forms an object detection frame to be displayed, based on a relationship of a size of the second object detection frame with respect to a size of the third object detection frame; and a display section that displays the object detection frame formed by the display frame forming section.

An object detection frame display method according to an aspect of the present invention includes: an object detection frame computation step of determining first object detection frames each indicating a region of a detection target object from an input image, and further determining a second object detection frame by integrating the first object detection frames analogically inferred to be object detection frames related to the same detection target object; a containment frame computation step of determining, for each of the second object detection frames, a third object detection frame containing the first object detection frames serving as a basis for determining the second object detection frame; and a display frame formation step of forming an object detection frame to be displayed, based on a relationship of a size of the second object detection frame with respect to a size of the third object detection frame.

Advantageous Effects of Invention

According to the present invention, an object detection frame easily viewable by a user can be displayed with a relatively small amount of processing.

BRIEF DESCRIPTION OF DRAWINGS

FIGS. 1A to 1D are diagrams showing an example of how object detection frames with poor appearance is displayed because of not-separated object detection frames;

FIGS. 4A and 4B are diagrams showing the processing by a plural object existence estimation section and a display frame forming section;

FIGS. 6A to 6C are diagrams showing the object detection frame forming processing according to Embodiment 1 in an easily understandable manner;

FIGS. 11A to 11C are diagrams showing object detection frame forming processing according to Embodiment 2 in an easily understandable manner;

FIGS. 12A to 12D are diagrams showing a display example of an object detection frame according to Embodiment 2;

FIGS. 14A and 14B are diagrams provided to describe object detection frame forming processing performed by a display frame forming section of Embodiment 3;

FIGS. 15A to 15C are diagrams provided to describe object detection frame forming processing performed by the display frame forming section of Embodiment 3, in particular describing the processing when the number of determined object detection frames does not coincide with the number of object-detection-frame candidate positions; and FIGS. 16A to 16C are diagrams showing object detection frame forming processing according to Embodiment 3 in an easily understandable manner.

DESCRIPTION OF EMBODIMENTS

Embodiments of the present invention will be described below in detail with references made to the drawings.

Embodiment 1

Figure 2:
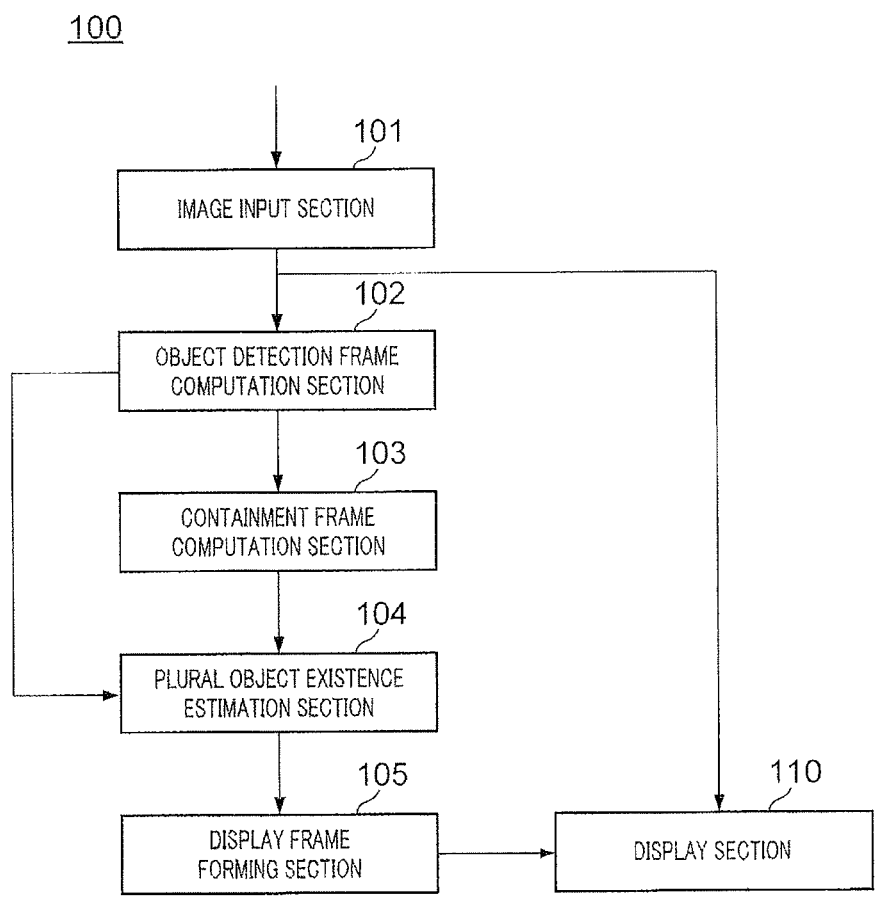
FIG. 2 is a block diagram showing the configuration of an object detection frame display apparatus of Embodiment 1.

FIG. 2 shows the configuration of an object detection frame display apparatus in Embodiment 1 of the present invention. Object detection frame display apparatus 100 is provided in, for example, a digital camera, an in-vehicle navigation apparatus, or a surveillance camera system.

Object detection frame display apparatus 100 inputs an image to image input section 101. The input image is, for example, an image that is captured by a digital camera, an in-vehicle navigation apparatus, or a surveillance camera system. Image input section 101 outputs the input image to display section 110 and object detection frame computation section 102.

Object detection frame computation section 102 performs pattern recognition processing of the input image so as to determine first object detection frames (object detection frame candidates) indicating a region of a detection target object, and further integrates first object detection frames that are analogically inferred to be object detection frames related to the same detection target object so as to determine a second object detection frame. Stated differently, object detection frame computation section 102 groups the first object detection frames into a cluster so as to determine a second object detection frame.

The first object detection frames are the frames shown by thin lines in FIGS. 1A to 1D. The second object detection frames are shown by thick lines in FIGS. 1A to 1D.

Specifically, object detection frame computation section 102, by adopting processing such as described in PTL 2, for example, determines the first object detection frames and the second object detection frame.

The first object detection frames are rectangles surrounding partial image regions that have an indicator value indicating the similarity with the detection target object, which is at least a threshold value. The first object detection frames are so-called object detection frame candidates, and actually a plurality of candidates in the area surrounding the detection target object are determined.

Next, object detection frame computation section 102 sets each region surrounded by a first object detection frame (each candidate region) as a candidate region of interest. If, among candidate regions other than the candidate regions of interest, there is a nearby candidate region having a coordinate distance from the candidate region of interest that is not greater than a prescribed distance, object detection frame computation section 102 sets the candidate region of interest and the nearby candidate region as one candidate group. Next, object detection frame computation section 102 computes an integrated indicator value which reflects the magnitude of the plurality of indicator values, based on the plurality of computed indicator values with respect to the candidate regions forming the candidate group. Next, if the integrated indicator value is at least a second threshold, object detection frame computation section 102 takes an image within a prescribed region on the input image that includes the candidate group for which the integrated indicator value has been computed to be the detection target object image, and forms a second object detection frame that surrounds that image.

The processing performed by object detection frame computation section 102 is not restricted to the above-noted processing. That is, it is sufficient to determine a second object detection frame by detecting image regions having a high similarity with a detection target object image (for example, an image of a person, a face, or a vehicle) so as to form first object detection frames surrounding that image region candidate, and then integrate first object detection frames that are analogically interred to be object detection frames related to the same detection target object. The present invention is not restricted to the method of determining the first object detection frames and the second object detection frame.

Object detection frame computation section 102 outputs position information of the first object detection frames and position information of the second object detection frame to containment frame computation section 103. Object detection frame computation section 102 outputs position information of the second object detection frame to plural object existence estimation section 104. The position information of an object detection frame includes information of the rectangular size of the object detection frame (information regarding the size of the rectangle). That is, the position information of an object detection frame is information that can indicate the position of the overall object detection frame. The same is true with regard to the position information of the object detection frames described below.

Figure 3:
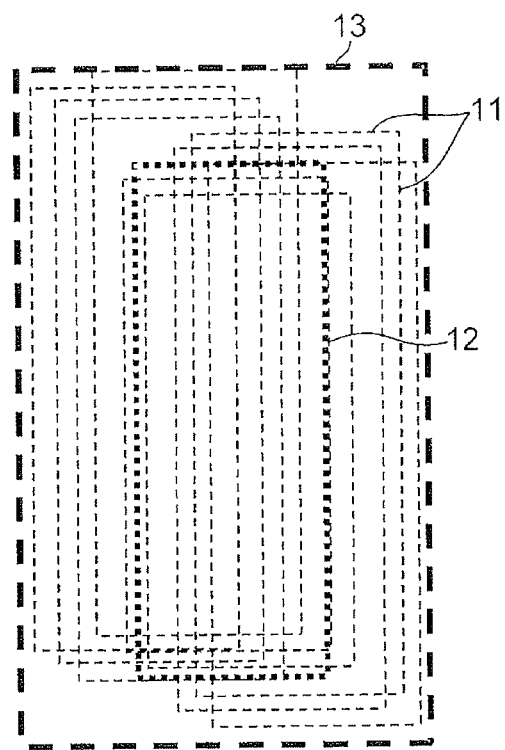
FIG. 3 is a diagram provided to describe a third object detection frame (containment frame)

The containment frame computation section 103, as shown in FIG. 3, for each second object detection frame 12, determines the containment frame that contains first object detection frame 11 serving as the basis for determining the second object detection frame 12, as third object detection frame 13. In this case, third object detection frame (containment frame) 13, as its name implies, may be a frame that contains first object detection frame 11. Third object detection frame 13 is, for example, the smallest rectangle containing a plurality of first object detection frames 11. Third object detection frame 13, for example, is the union set of a plurality of first object detection frames 11. Containment frame computation section 103 outputs position information of a determined third object detection frame 13 to plural object existence estimation section 104.

Plural object existence estimation section 104 inputs position information of second object detection frame 12 and position information of third object detection frame 13, and checks the size of second object detection frame 12 with respect to third object detection frame 13, using this information. Plural object existence estimation section 104 thus estimates whether or not a plurality of detection target objects exists nearby second object detection frame 12. Plural object existence estimation section 104 outputs to display frame forming section 105 information of the estimation result indicating whether or not a plurality of objects exist, position information of second object detection frame 12, and position information of third object detection frame 13.

Display frame forming section 105 forms an object detection frame to be displayed (hereinafter call a display object detection frame). If display frame forming section 105 receives as input from plural object existence estimation sections 104 estimation result information indicating that a plurality of detection target objects do not exist near second object detection frame 12, display frame forming section 105 outputs second object detection frame 12 as the display object detection frame. In contrast, if display frame forming section 105 receives as input from plural object existence estimation sections 104 estimation result information indicating that a plurality of detection target objects exist near second object detection frame 12, display frame forming section 105 forms and outputs a display object detection frame that is an enlarged second object detection frame 12.

FIGS. 4A and 4B show the processing performed by plural object existence estimation section 104 and display frame forming section 105. The thin dotted lines in the drawing indicate second object detection frames 12, the coarse dotted lines indicate third object detection frames 13, and the solid lines indicate display object detection frames 14.

FIG. 4A (upper row) shows examples of second object detection frame 12 and third object detection frame 13 input to plural object existence estimation section 104. The drawing shows four examples. FIG. 4B (lower row) shows display object detection frames 14 that are formed by display frame forming section 105.

As shown in the drawing, the vertical and horizontal lengths of third object detection frame 13 are taken to be A_H and A_W, respectively, and the vertical and horizontal lengths of second object detection frames 12 are taken to be B_H and B_W, respectively.

Taking the distance thresholds to be TH_H and TH_W, if the condition |A_H−B_H|>TH_H or the condition |A_W−B_W|TH_W is satisfied, plural object existence estimation section 104 judges that a plurality of second object detection frames 12 exist nearby.

If the relationship between second object detection frame 12 and third object detection frame 13 satisfies the above-noted condition, display frame forming section 105 forms display object detection frame 14 with its center at the center position of second object detection frame 12 and having a vertical length of (A_H++B_H)/2 and a horizontal length of (A_W+B_W)/2. The size of display object detection frame 14 is not restricted to this, and it is sufficient if the size of display object detection frame 14 be equal to or greater the size of second object detection frame 12 but not greater than the size of third object detection frame 13.

In FIGS. 4A and 4B, the leftmost example shows the case in which plural object existence estimation section 104 estimates that a plurality of objects does not exist near second object detection frame 12. In this case, as shown in the leftmost example of FIG. 4A, the difference between the sizes of second object detection frame 12 and third object detection frame 13 does not exceed the threshold, and display frame forming section 105 outputs second object detection frame 12 as display object detection frame 14, as shown in the leftmost example in FIG. 4B.

In contrast, the three examples in FIGS. 4A and 4B other than the leftmost example show cases in which plural object existence estimation section 104 estimates that a plurality of objects exists near second object detection frame 12. In this case, as shown in the examples other than the leftmost example in FIG. 4A, the difference between the sizes of second object detection frame 12 and third object detection frame 13 exceeds the threshold (in the second example from the left, the difference in the horizontal lengths is greater the threshold, in the third example from the left, the difference in the vertical lengths is greater the threshold, and in the fourth example from the left the differences in both the horizontal and vertical lengths are greater the threshold), and display frame forming section 105 forms display object detection frame 14 between second object detection frame 12 and third object detection frame 13, as shown in examples other than the leftmost examples of FIG. 4A. More specifically, the display object detection frame 14 is larger than second object detection frame 12 and not larger than third object detection frame 13.

Display section 110 superimposes and then displays display object detection frame 14 received as input from display frame forming section 105 on the captured image received as input from image input section 101.

Figure 5:
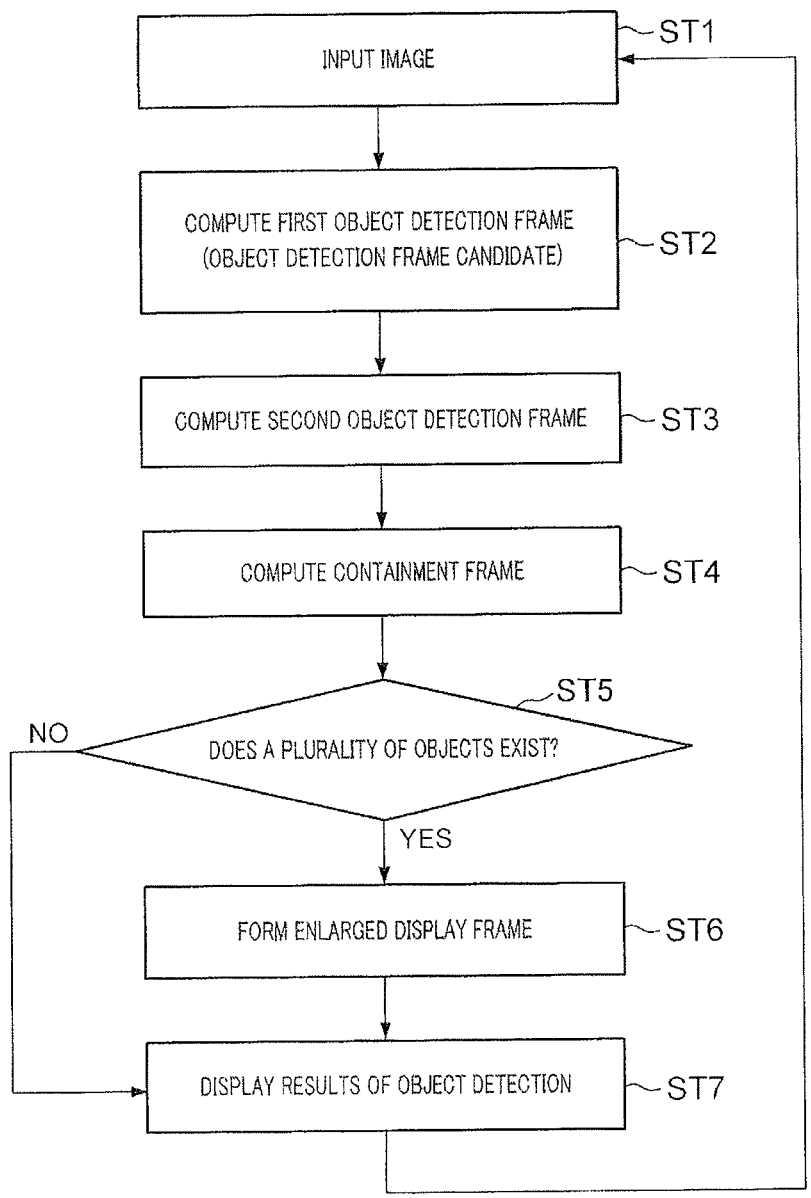
FIG. 5 is a flowchart showing the processing procedure of the object detection frame display apparatus of Embodiment 1.

FIG. 5 is a flowchart showing the procedure of object detection frame display apparatus 100. At step ST1, object detection frame display apparatus 100 inputs an image to image input section 101. At the following step ST2, object detection frame computation section 102 computes first object detection frames (object detection frame candidates) 11. At the following step ST3, object detection frame computation section 102 computes second object detection frame 12 by integrating first object detection frames 11. At the following step ST4, containment frame computation section 103 computes third object detection frame (containment frame) 13. At the following step ST5, plural object existence estimation section 104 estimates, from the relationship between the sizes of second object detection frame (integrated frame) 12 and third object detection frame (containment frame) 13, whether or not a plurality of detection target objects exist near second object detection frame 12.

If an estimation result is obtained indicating the existence of a plurality of detection target objects near second object detection frames 12 (YES at step ST5), object detection frame display apparatus 100 transitions to step ST6 display frame forming section 105 forms a display object detection frame 14 having a shape that is an enlargement of second object detection frame 12, and at the following step ST7, object detection frame display apparatus 100 causes display section 110 to display this object detection frame 14 along with the captured image.

In contrast, if an estimation result is obtained indicating the nonexistence of a plurality of detection target objects near second object detection frame 12 (NO at step ST5), object detection frame display apparatus 100 transitions to step ST7 and causes display section 110 to display second object detection frame 12 along with the captured image.

FIGS. 6A to 6C show the relationship between a detection target object (persons in the example shown) and each object detection frame in an easily understandable manner. In FIGS. 6A to 6C, the drawings in the upper row show the relationship between detection target objects, second object detection frames (integrated frames) 12, and third object detection frames (containment frames) 13. The drawings in the lower row show the relationship between detection target object and the ultimately displayed display object detection frame 14.

The example shown in FIG. 6A shows the ideal situation, in which second object detection frames 12 respectively surround persons, properly, in which case, as shown in the lower row, second object detection frames 12 are displayed as display object detection frames 14 as is.

The example shown in FIG. 6B shows the situation in which, because of an improper second object detection frame 12, there are persons spilling outside of second object detection frame 12, in which case, as shown in the lower row, display object detection frame 14 formed by enlarging second object detection frame 12 is displayed. This enables persons spilling outside of second object detection frame 12 if displayed as is to be surrounded by display object detection frame 14. Second object detection frame 12 being improper is judged from the size of second object detection frame 12 with respect to the size of third object detection frame 13 being not greater than a threshold.

The example shown in FIG. 6C is an example in which although the left-side second object detection frame 12-1 is proper, the right-side second object detection frame 12-2 is improper. In this case, as shown in the lower row, the left-side second object detection frame 12-1 is displayed as display object detection frame 14-1 as is, and the right-side second object detection frame 12-2 is displayed enlarged as display object detection frame 14-2. This enables persons spilling outside of right-side second object detection frame 12-2 if displayed as is to be surrounded by display object detection frame 14-2. Right-side second object detection frame 12-2 being improper is judged from the size of the right-side second object detection frame 12-2 with respect to the size of the right-side third object detection frame 13-2 being not greater than a threshold.

FIGS. 7A to 7D show example images displayed by the object detection frame display apparatus of the present embodiment. FIGS. 7A to 7D show time-sequence images of substantially the same position captured in the sequence FIGS. 7A, 7B, 7C, and then 7D. Object detection frame display apparatus 100 detects two persons in the image to be captured. The rectangles shown in the diagrams by thin lines are first object detection frames 11, and the rectangles shown by thick lines are ultimate integrated frames 14 ultimately displayed by the present embodiment.

Figure 7B:
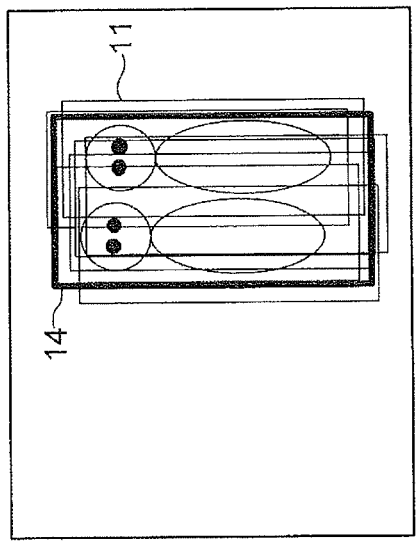
FIGS. 7A to 7D are diagrams showing display examples of object detection frames according to Embodiment 1.
Figure 7D:
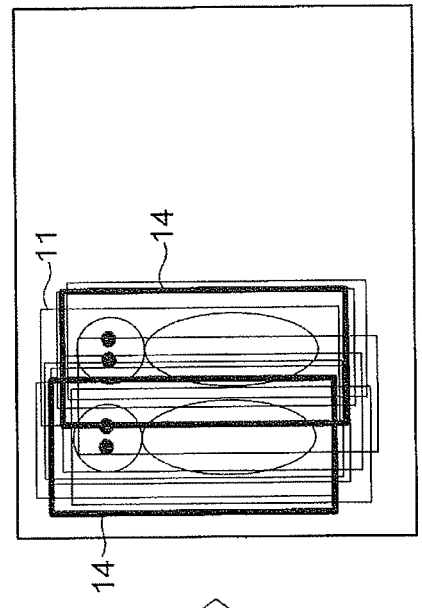
Figure 7A:
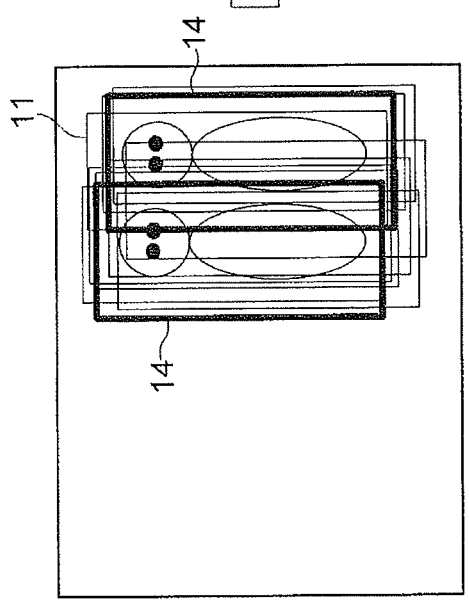

Comparing FIGS. 7A to 7D, which are display examples in the present embodiment, with FIGS. 1A to 1D that show conventional display examples, in the time-sequence images of FIGS. 7A and 7D, because separation of second object detection frames 12 succeeds, similar to the time sequence of FIGS. 1A and 1D, the second object detection frames (described as the ultimately integrated frames in the description of FIGS. 1A to 1D) are displayed as object detection frames 14 as is.

Figure 7C:
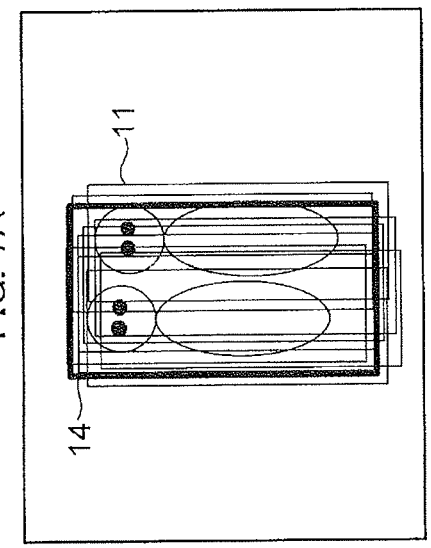

In contrast, in the time-sequence images of FIGS. 7B and 7C, because separation of second object detection frame 12 fails (refer to FIGS. 1B and 1C), object detection frame 14, which is an enlargement of second object detection frame 12, is displayed. Because display object detection frame 14 contains the two persons, which are the detection target objects, without spilling outside, compared with second object detection frame (ultimately integrated frame) 12 displayed as shown in FIGS. 1B and 1C, display object detection frame 14 looks good and is easily viewable.

As described above, according to the present embodiment, there are provided: object detection frame computation section 102 that performs pattern recognition processing of the input image so as to determine first object detection frames 11 indicating a region of a detection target object, and that further integrates first object detection frames 12 that are analogically inferred to be object detection frames related to the same detection target object so as to determine a second object detection frame 12; containment frame computation section 103 that, for each second object detection frame 12, determines third object detection frame 13 that contains first object detection frame 11 serving as the basis for determining second object detection frame 12; and display frame forming section 105 that forms object detection frame 14 to be displayed based on the relationship of the size of second object detection frame 12 with respect to the size of third object detection frame 13.

Doing the above, because display frame forming section 105 can form object detection frame 14 that is an enlargement of second object detection frame 12, even if the separation of second object detection frame 12 in object detection frame computation section 102 fails, object detection frame 14 which looks good and is easily viewable can be displayed.

In addition, when the configuration of the present embodiment is adopted, the integration algorithm in object detection frame computation section 102 does not have to be complex, and also, because the amount of processing of the added containment frame computation section 103 and display frame forming section 105 need only be relatively small, the increase in amount of processing is small.

Embodiment 2

Figure 8:
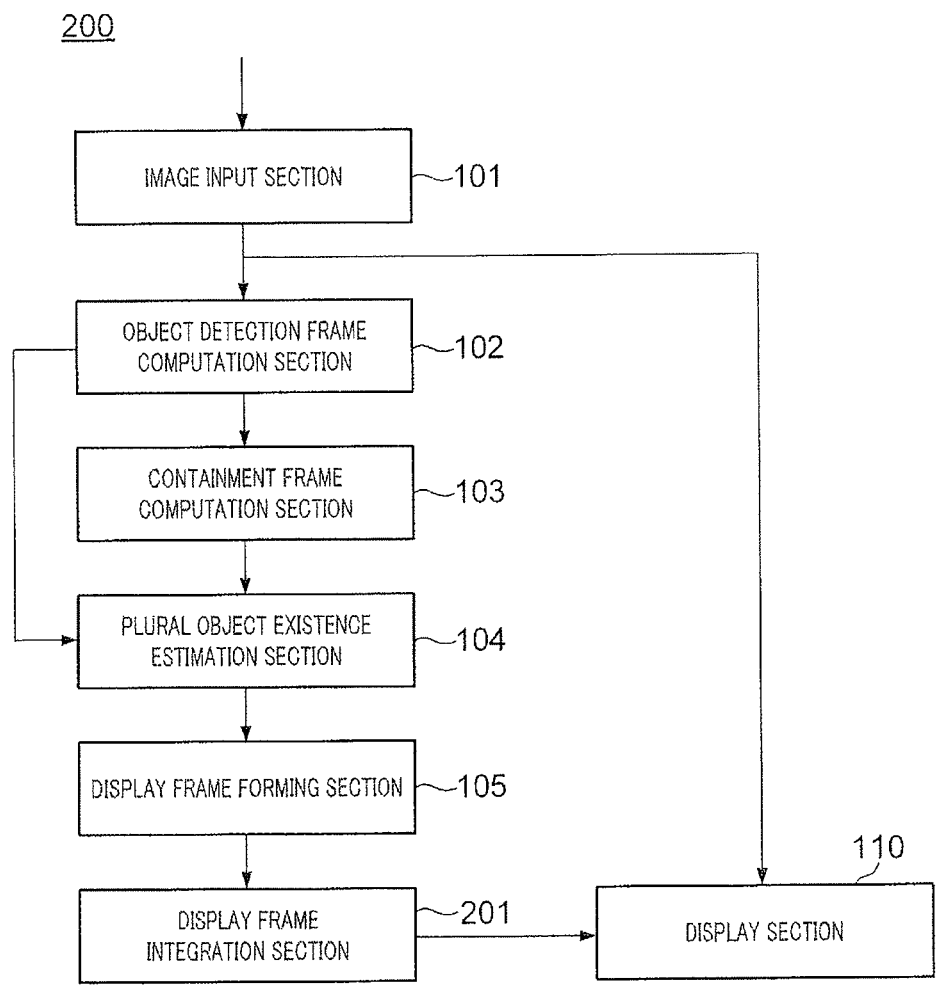
FIG. 8 is a block diagram showing the configuration of an object detection frame display apparatus of Embodiment 2.

In FIG. 8, parts corresponding to those in FIG. 2 are assigned the same reference signs, and the configuration of object detection frame display apparatus 200 of the present embodiment is illustrated. Object detection frame display apparatus 200 as shown in FIG. 8 includes display frame integration section 201 in addition to the configuration of object detection frame display apparatus 100 of FIG. 2.

Display frame integration section 201 receives, as input, position information of an object detection frame formed by display frame forming section 105. As a specific example, display frame integration section 201 receives, as input, position information of a second object detection frame (including an enlarged second object detection frame) from display frame forming section 105.

Display frame integration section 201 detects second object detection frames that satisfy a condition in which a mutual distance between frames is not greater than a first threshold and a mutual ratio of sizes of the frames is not greater than a second threshold. Display frame integration section 201 then integrates the detected second object detection frames, and forms and outputs to display section 110 a display object detection frame that contains a plurality of second object detection frames satisfying the condition. In contrast, display frame integration section 201 outputs second object detection frames that do not satisfy the above-noted condition as is to display section 110 without integrating them. In this case, the reason for adding "a mutual ratio of sizes of the frames is not greater than a threshold" to the integration condition is that, for example, even though there are cases in which a detection frame of a person toward the foreground in the screen and a detection frame of a person toward the background in the screen should not be integrated, if the integration conditions are only the detection frame distance threshold, there is a risk that these detection frames will be integrated. By adding the size threshold, because the frame of a person toward the foreground in a frame is large and the frame of a person toward the background in the frame is small, the ratio of the sizes of the detection frames should be larger than a threshold, thereby preventing an improper integration. In the following, to simplify the description, the description will mainly be provided for the case of using only the distance threshold as an integration condition.

Display frame integration section 201 may, for example, integrate second object detection frames in which regions are mutually partially overlapping. This case corresponds to a case where the above-noted distance threshold is zero. The threshold is not a restriction, however, and the setting can be made as is appropriate.

Figure 9B:
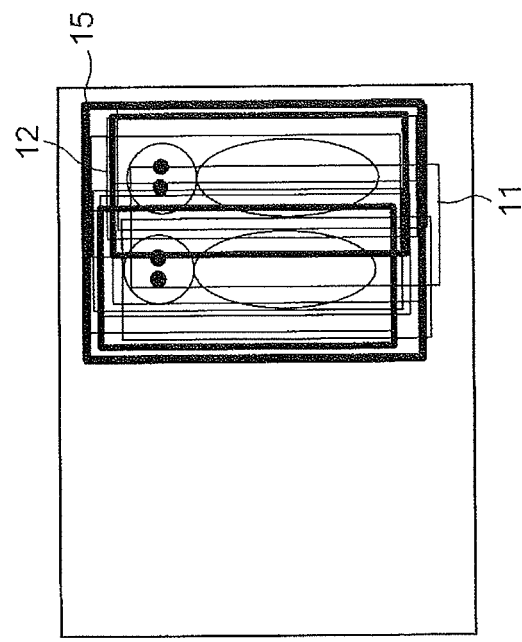
FIGS. 9A and 9B are diagrams showing the integration processing performed by a display frame integration section.
Figure 9A:
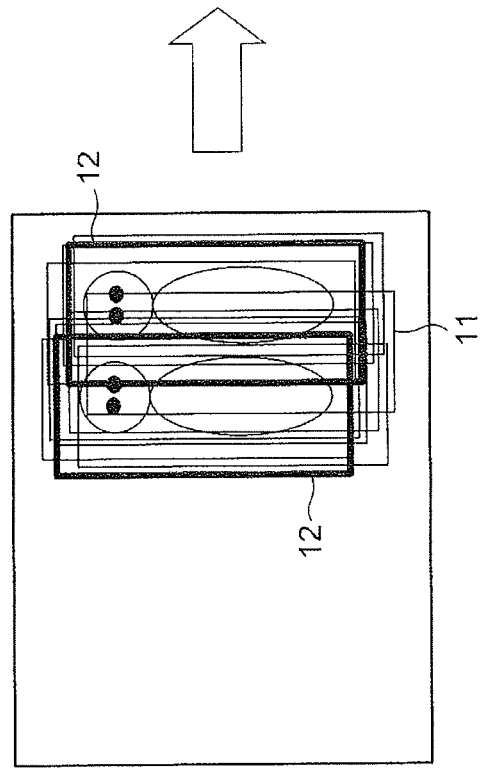

FIGS. 9A and 9B show how the integration processing is performed by display frame integration section 201. If, as shown in FIG. 9A, the distance between second object detection frames 12 output from display frame forming section 105 does not exceed the threshold, second display frame integration section 201, as shown in FIG. 9B, integrates second object detection frames 12 having a distance not exceeding the threshold, and forms object detection frame 15 surrounding second object detection frames 12. Object detection frame 15 is displayed on display section 110. In FIG. 9B, for the sake of convenience, although frames other than object detection frame 15 displayed by frame integration section 201 are shown, the object detection frame displayed on display section 110 in FIG. 9B is only object detection frame 15.

Figure 10:
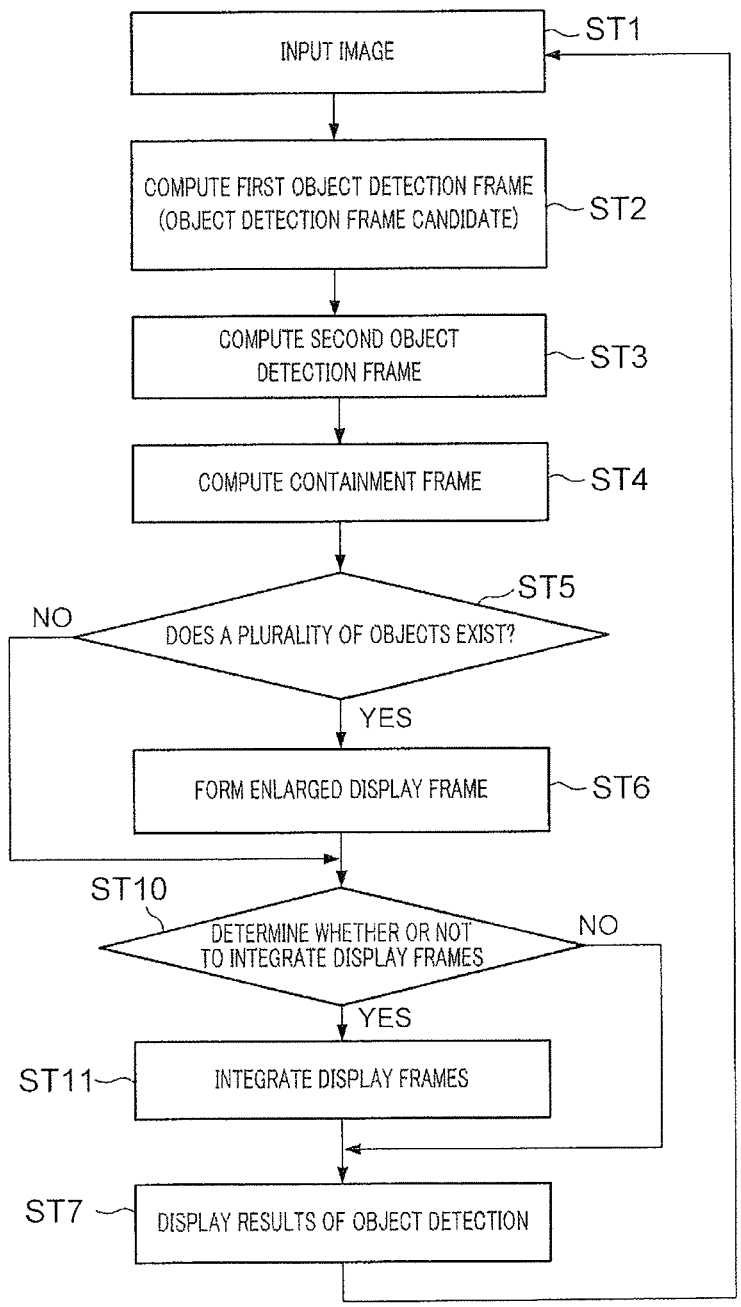
FIG. 10 is a flowchart showing the processing procedure of the object detection frame display apparatus of Embodiment 2.

FIG. 10 is a flowchart showing the processing procedure of object detection frame display apparatus 200. In FIG. 10, procedure parts that are the same as in FIG. 5 are assigned the same reference signs as in FIG. 5. The procedure parts that differ from FIG. 5 are described below.

At step ST6, when display frame forming section 201 forms display object detection frame 14 having a shape that is an enlargement of second object detection frame 12, object detection frame display apparatus 200 proceeds to step ST10. At step ST10, display frame integration section 201 makes the above-noted distance judgment with regard to each second object detection frame 12 (including enlarged second object detection frame 14), so as to judge whether or not the object detection frames should be integrated.

In this case, display frame integration section 201 obtains a negative result at step ST10 (NO at step ST10) for second object detection frames 12 and 14 having a distance that is larger than the threshold, and outputs second object detection frames 12 and 14 as is to display section 110 without integrating the frames. By doing this, second object detection frames 12 and 14 are displayed as is at step ST7.

In contrast, display frame integration section 201 obtains a positive result at step ST10 (YES at step ST10) for second object detection frames 12 and 14 having a distance that is not greater than the threshold, and transitions to step ST11. At step ST11, by integrating second object detection frames 12 and 14 having a distance that is not greater than the threshold, display frame integration section 201 forms object detection frame 15 that contains the frames, and outputs the integrated object detection frame 15 to the display section. By doing this, second object detection frame 15 that is integrated at step ST7 is displayed.

FIGS. 11A to 11C are diagrams showing object detection frames displayed by the present embodiment, in an easily understandable manner. In comparison with FIGS. 6A to 6C described in Embodiment 1, because the characteristics of the object detection frames displayed in the present embodiment are well understood, in the following the differences with respect to FIGS. 6A to 6C will be described.

In the case, such as in the example shown in FIG. 11A, in which case second object detection frames 12 such as shown in the upper row are obtained by object detection flame computation section 102, because the distances of these object detection frames 12 do not exceed the threshold, display frame integration section 201 integrates these object detection frames 12, thereby forming and causing display of object detection frame 15 such as shown in the lower row.

In the case, such as in the example shown in FIG. 11B, in which case second object detection frame 12 such as shown in the upper row is obtained by object detection frame computation section 102, as described regarding Embodiment 1, second object detection frame 12 is enlarged by display frame forming section 105 and is taken as object detection frame 14. When this is done, because there is no object detection frame having a distance from object detection frame 14 that does not exceed the threshold, object detection frame 14 is not integrated, and is displayed as shown in the lower row.

In the case, such as in the example shown in FIG. 11C, in which case second object detection frames 12 such as shown in the upper row are obtained by object detection frame computation section 102, as described regarding Embodiment 1, second object detection frame 12 is enlarged by display frame forming section 105 and is taken as object detection frame 14. When this is done, because the distances of the plurality of object detection frames 14 do not exceed the threshold, the plurality of object detection frames 14 are made into the integrated object detection frame 15 as shown in the lower row and displayed.

FIGS. 12A to 12D show examples of images displayed by the object detection frame display apparatus 200 of the present embodiment. FIGS. 12A to 12D show time-sequence images of substantially the same position captured in the sequence FIGS. 12A, 12B, 12C, and then 12D. The frames shown by thin lines in the drawing are first object detection frames 11, and the rectangular frames shown by thick lines are object detection frames 15 ultimately displayed in the present embodiment.

Comparing FIGS. 12A to 12D, which are display examples in the present embodiment, with FIGS. 7A to 7D, which are display examples in Embodiment 1, in the time-sequence images in FIGS. 12A and 12D, object detection frames having a distance that does not exceed the threshold are integrated and displayed as object detection frame 15. In the time-sequence images in FIGS. 12B and 12C, because there is no frame having a distance that does not exceed the threshold, object detection frame 14 is not integrated and is displayed as object detection frame 15 as is.

As described above, according to the present embodiment, in addition to the configuration of Embodiment 1, by providing display frame integration section 201 that integrates close second object detection frames 12 and 14, in addition to the effect of Embodiment 1, increases in variation in the number of object detection frames 15 that are displayed in a time-sequence image can be prevented, enabling a more easily viewable display of object detection frame 15.

That is, although by adopting the configuration of Embodiment 1, it is possible to form an object detection frame from which there is no extreme spillover of detected objects, the number of object detection frames may vary frequently such as two or one in the same object region in time-sequence images. Adopting the configuration of the present embodiment prevents such variation, and in time-sequence images, prevents increases in variation in the number of object detection frames for the same detected object.

Also, although a similarity in size (that is, with a ratio between mutual sizes that does not exceed the threshold) accompanied by overlap (that is, with a mutual distance that does not exceed a threshold) might cause flicker, the problem of flicker is eliminated because integration eliminates such object detection frames.

Embodiment 3

Figure 13:
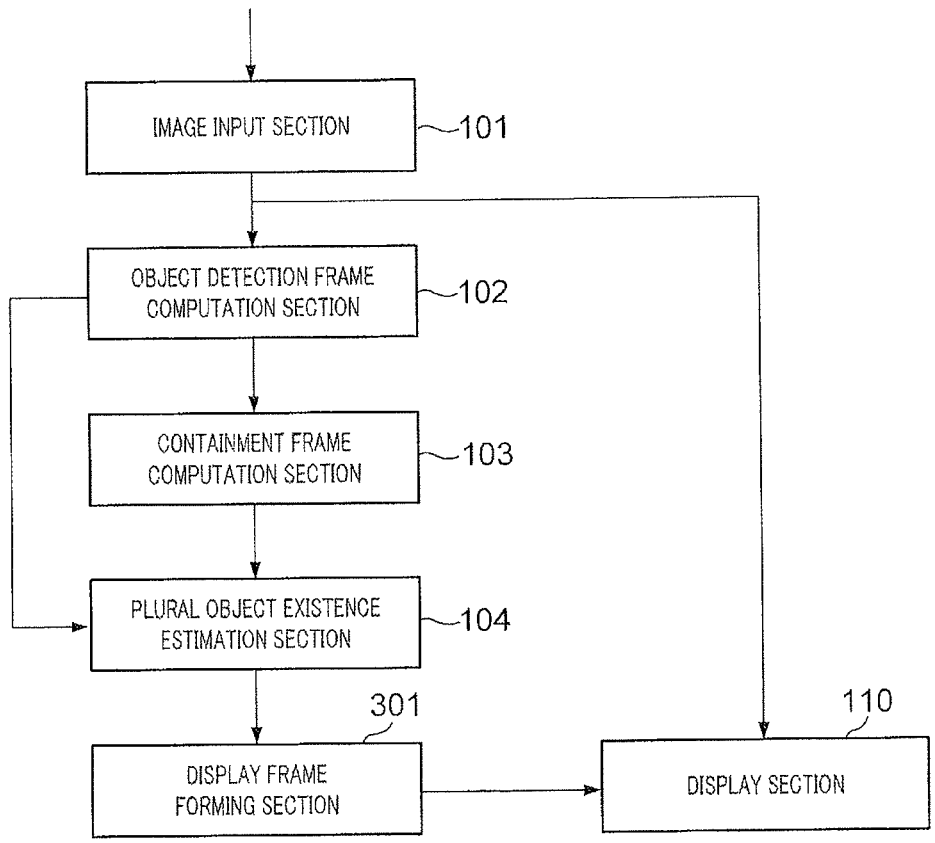
FIG. 13 is a block diagram showing the configuration of an object detection frame display apparatus of Embodiment 3.

In FIG. 13, parts corresponding to those in FIG. 2 are assigned the same reference signs, and the configuration of object detection frame display apparatus 300 of the present embodiment is illustrated. In object detection frame display apparatus 300 in FIG. 13, compared with object detection frame display apparatus 100 of FIG. 2, display frame forming section 301 differs in configuration from display frame forming section 105.

If estimation result information indicating that a plurality of detection target objects do not exist near second object detection frame 12 is received as input from plural object existence estimation section 104, display frame forming section 301 outputs second object detection frame 12 as the display object detection frame. In contrast, if estimation result information indicating that a plurality of detection target objects exist near second object detection frame 12 is received as input from plural object existence estimation section 104, display frame forming section 301 forms a plurality of second object detection frames as display object detection frames within third object detection frame 13.

Stated differently, when the size of second object detection frames 12 in relationship to the size of third object detection frame 13 is less than a threshold, display frame forming section 301 forms and displays a plurality of object detection frames within third object detection frame 13.

In the case of the present embodiment, based on the ratio of the size of second object detection frames 12 with respect to the size of third object detection frame 13, display frame forming section 301 determines the number of display object detection frames to form within third object detection frame 13.

The processing performed by display frame forming section 301 of the present embodiment forming object detection frames will be described using FIGS. 14A and 14B. The thin dotted lines in the drawings indicate second object detection frame 12, the thick dotted lines indicate third object detection frames 13, and the solid lines indicate display object detection frames 16.

(1) Determination of the Number of Object Detection Frames 16:

The number of display object detection frames 16 to be formed is determined by making a threshold judgment of the ratio of surface areas between third object detection frame 13 and second object detection frame 12. In this case, as shown in FIG. 14A, the vertical and horizontal lengths of third object detection frame 13 are taken, respectively, to be A_H and A_W and the vertical and horizontal lengths of second object detection frame 12 are taken, respectively, to be B_H and B_W. Given this, the surface area ratio R is (A_W×A_H)/(B_W×B_H). The number of display object detection frames 16 to be displayed is determined by comparing this surface area ratio to a prescribed threshold. For example, thresholds TH1, TH2, TH3, and TH4 are set so as to satisfy the condition TH1>TH2>TH3>TH4. Then, the determination may be made so that the number of object detection frames 16 is one if TH1<R, two if TH1≥R>TH2, three if TH2≥R>TH3, and four if TH3≥R>TH4. FIG. 14B shows an example in which the number of display object detection frames 16 is two.

(2) Size of Object Detection Frame 16:

The size of object detection frame 16 is such that the vertical and horizontal lengths are, respectively, B_H and B_W. That is, the size of each object detection frame 16 is the same size as second object detection frame 12. Stated differently, each object detection frame 16 is a copy of second object detection frame 12.

(3) Position of Object Detection Frame 16:

If the position of each object detection frame 16 is X=(A_W/(B_W) and Y=(A_H)/(B_H), the horizontal A_W and vertical A_H of third object detection frame 13 have, respectively, center positions that are equally divided by X+1 and Y+1. The example shown in FIG. 14B is a case where X=2 and Y=1, in which object detection frames 16 having center positions of A_W and A_H that are equally divided by 2+1 (i.e., 3) and 1+1 (i.e., 2).

There are cases in which the determined number of object detection frames 16 does not coincide with the number of positions of object detection frames 16. Specifically, although there is no problem when detection objects are close to one another in the horizontal direction or the vertical direction, there may be cases in which the above-noted difference in numbers occurs when detection objects are close to one another in vertical and horizontal directions. The reasons for this and countermeasures are described below, using FIGS. 15A to 15C.

FIG. 15A is the case in which the determined number of object detection frames 16 and the number of positions of object detection frames 16 coincide, in which case there is no problem. In contrast, in the example shown in FIG. 15B, the problem of whether to make the number of object detection frames 16 three or four arises (it is actually desirable to determine this as three).

Given this, as a countermeasure in the present embodiment, the positions of A_W and A_H are first divided equally by X+1 and Y+1, respectively and taken as the candidate center points of the object detection frames 16 to be ultimately displayed. If the number of candidate points coincides with the determined object detection frames 16 having the candidate points as center positions are formed and displayed as is.

In contrast, if the number of object detection frames determined by the above-noted surface area ratio is fewer than the number of candidate points, the overlap between regions of the object detection frames 16 having centers at the candidate points and a region of a first object detection frame 11 serving as the basis for determining third object detection frame 13 is determined, with selection being made in the sequence of decreasing size of overlapping regions. In this case, the region of first object detection frame 11 serving as the basis for determining third object detection frame 13 is, as shown in FIG. 15C, the union set region of a plurality of first object detection frames 11 serving as the basis for determining third object detection frame 13.

Considering the examples shown in FIGS. 15B and 15C, comparing with object detection frames 16-2, 16-3, and 16-4 formed with centers at candidate points K2, K3, and K4, because object detection frame 16-1 formed with its center point at candidate point K1 has an overlap with the shaded region in FIG. 15C that is small, object detection frame 16-1, which is formed with its center at candidate point K1, may be removed from the object detection frames ultimately displayed. Doing this enables the ultimately displayed frames to be made to coincide with the number of object detection frames determined by the surface area ratio, and also enables proper candidate points to be left from among a plurality of candidate points, so as to form object detection frames 16-2, 16-3, and 16-4 (refer to FIG. 15B).

FIGS. 16A to 16C show object detection frames 16 that is displayed in the present embodiment. In comparison with FIGS. 16A to 16C described with regard to Embodiment 1, because the characteristics of the object detection frame 16 displayed by the present embodiment are well understood, in the following the differences with respect to FIGS. 6A to 6C will be described.

In the case, such as in the example shown in FIG. 16A, in which second object detection frames 12 such as shown in the upper row are obtained by object detection frame computation section 102, because the sizes of second object detection frames 12 in relation to the size of third object detection frames 13 is such that it is at least the threshold, second object detection frames 12 are displayed as display object detection frames 16 as is, as shown in the lower row.

In the case, such as in the example shown in FIG. 16B, in which second object detection frames 12 such as shown in the upper row are obtained by object detection frame computation section 102, because the size of second object detection frames 12 in relation to the size of third object detection frame 13 is less than the threshold, a plurality of object detection frames 16 are formed within third object detection frame 13.

In the case, such as shown in FIG. 16C, in which second object detection frames 12 such as shown in the upper row are obtained by object detection frame computation section 102, the size of the left-side second object detection frame 12-1 in relationship to third object detection frame 13-1 is at least the threshold, and the size of the right-side second object detection frame 12-2 in relationship to third object detection frame 13-2 is less than the threshold. Thus, the left-side second object detection frame 12-1 is displayed as display object detection frame 16 as is, and the right-side second object detection frame 12-2 is formed and display as a plurality of object detection frames 16 within the third object detection frame 13-2.

As described above, according to the present embodiment, in addition to the configuration of Embodiment 1, when the size of second object detection frame 12 is less than a threshold in relationship to the size of third object detection frame 13, display frame forming section 301 forms a plurality of object detection frames 16 within third object detection frame 13. Additionally, the number of display object detection frames 16 to be formed within third object detection frame 13 is determined based on the ratio of size of second object detection frame 12 with respect to the size of third object detection frame 13.

Because, in addition to achieving the effect of Embodiment 1, this enables limiting increases in variation in the number of object detection frames 16 that are displayed in a time-sequence image, it is possible to display more easily viewable object detection frames 16.

The configuration elements in object detection frame display apparatuses 100, 200, and 300 in the above-described embodiments, other than image input section 101 and display section 110, can be formed by a computer such as a personal computer including memory and a CPU. The functions of each configuration element can be implemented by a CPU reading and executing a computer problem stored in memory.

The disclosure of Japanese Patent Application No. 2011-130200, filed on Jun. 10, 2011; including the specification, drawings and abstract, is incorporated herein by reference in its entirety.

INDUSTRIAL APPLICABILITY

The present invention is suitable for use in performing image recognition processing of an image captured by, for example, a digital camera or in-vehicle camera.

REFERENCE SIGNS LIST

11 First object detection frame
12 Second object detection frame
13 Third object detection frame
14, 15, 16 Display object detection frame
100, 200, 300 Object detection frame display apparatus
102 Object detection frame computation section
103 Containment frame computing section
104 Plural object existence estimation section
105, 301 Display frame forming section
110 Display section
201 Display frame integration section

The invention claimed is:
1. An object detection frame display apparatus comprising:
an object detection frame calculator, implemented by a processor, that determines first object detection frames each indicating a region of a detection target object from an input image, and that further determines a second object detection frame by integrating the first object detection frames analogically inferred to be object detection frames related to a same detection target object;

a containment frame calculator, implemented by a processor, that determines, for each second object detection frame, a third object detection frame containing the first object detection frames serving as a basis for determining the second object detection frame;

a display frame former, implemented by a processor, that provides an object detection frame to be displayed, based on a relationship of a size of the second object detection frame with respect to a size of the third object detection frame; and a display that displays the object detection frame provided by the display frame former, wherein the display frame former provides an object detection frame that is an enlargement of the second object detection frame, when the size of the second object detection frame in relationship to the size of the third object detection frame is less than a threshold.

2. The object detection frame display apparatus according to claim 1, wherein the size of the object detection frame displayed on the display is equal to or greater than the size of the second object detection frame, and is not greater than the size of the third object detection frame.

3. The object detection frame display apparatus according to claim 1, further comprising an object detection frame integrator, implemented by a processor, that detects second object detection frames satisfying a condition in which a distance between the second object detection frames is not greater than a first threshold and a ratio of sizes of the second object detection frames is not greater than a second threshold, and that integrates the detected second object detection frames to provide a display object detection frame including the second object detection frames satisfying the condition, wherein the display displays the display object detection frame provided by the display frame former and the object detection frame integrator.

4. The object detection frame display apparatus according to claim 3, wherein the second object detection frames to be integrated by the object detection frame integrator include partial regions that overlap each other.

5. The object detection frame display apparatus according to claim 1, wherein the display frame former provides a plurality of object detection frames within the third object detection frame, when the size of the second object detection frame in relationship to the size of the third object detection frame is less than a threshold.

6. The object detection frame display apparatus according to claim 1, wherein the display frame former determines a number of the display object detection frames provided within the third object detection frame based on the ratio of the size of the second object detection frame to the size of the third object detection frame.

7. An object detection frame display method comprising:
determining, by a processor, first object detection frames, each indicating a region of a detection target object from an input image;

determining, by a processor, a second object detection frame by integrating the first object detection frames analogically inferred to be object detection frames related to a same detection target object;

determining, by a processor, for each second object detection frame, a third object detection frame containing the first object detection frames serving as a basis for determining the second object detection frame; and providing, by a processor, an object detection frame to be displayed, based on a relationship of a size of the second object detection frame with respect to a size of the third object detection frame, wherein, in the providing, the object detection frame is provided as an enlargement of the second object detection frame, when the size of the second object detection frame in relationship to the size of the third object detection frame is less than a threshold.

* * * * *